US012766951B2

(12) United States Patent
Perry

(10) Patent No.: US 12,766,951 B2
(45) Date of Patent: Oct. 20, 2026

(54) POWER TAKEOFF ASSEMBLY HAVING A TWO-PART SHAFT ASSEMBLY

(71) Applicant: MUNCIE POWER PRODUCTS, INC., Muncie, IN (US)

(72) Inventor: Brian D. Perry, Claremore, OK (US)

( * ) Notice: Subject to any disclaimer, the term of this patent is extended or adjusted under 35 U.S.C. 154(b) by 0 days.

(21) Appl. No.: 19/311,172

(22) Filed: Aug. 27, 2025

(65) Prior Publication Data

US 2026/0061836 A1 Mar. 5, 2026

Related U.S. Application Data

(60) Provisional application No. 63/690,729, filed on Sep. 4, 2024.

(51) Int. Cl.
*B60K 17/28* (2006.01)
*F16H 57/023* (2012.01)

(52) U.S. Cl.
CPC .......... *B60K 17/28* (2013.01); *F16H 57/023* (2013.01)

(58) Field of Classification Search
CPC .......... B62D 5/02; B60K 25/06; B60K 17/28; F16H 57/023
See application file for complete search history.

(56) References Cited

U.S. PATENT DOCUMENTS

| | | | | |
|---|---|---|---|---|
| 6,224,289 B1 * | 5/2001 | Redd | ...................... | B60K 25/06 403/337 |
| 10,718,383 B2 * | 7/2020 | Spector | ................... | F16D 1/112 |
| 2018/0355919 A1 * | 12/2018 | Livengood | ............. | A01B 71/06 |

FOREIGN PATENT DOCUMENTS

| | | | |
|---|---|---|---|
| CN | 202579805 U * | 12/2012 | |
| WO | WO-2020091585 A1 * | 5/2020 | ........... F16H 57/025 |

OTHER PUBLICATIONS

Hu, CN 202579805 U, Machine Translation of Specification (Year: 2012).*
Valdes, WO 2020091585 A1, Machine Translation of Specification (Year: 2020).*

* cited by examiner

*Primary Examiner* — Jason D Shanske
*Assistant Examiner* — Matthew Joseph Ganci
(74) *Attorney, Agent, or Firm* — Dentons Bingham Greenebaum LLP; Brian W. Chellgren; Daniel L. Boots

(57) ABSTRACT

The present invention relates to systems and methods of end-play adjustment in a PTO assembly utilizing a two-part shaft assembly in the PTO assembly. The two-part shaft assembly allows for the overall shaft assembly to effectively change length, allowing for the in-field adjustment of bearing end-play. The two-part shaft assembly includes a main shaft having a smaller diameter extension extending along the axis of the shaft, the extension having a face portion and a threaded portion opposite the face portion; and an end cap having a face portion, an opening opposite the face portion, a sidewall extending between the face portion and the opening, and an internal threaded section, wherein the opening is sized to receive and engage at least a portion of the extension.

16 Claims, 7 Drawing Sheets

POWER TAKEOFF ASSEMBLY HAVING A TWO-PART SHAFT ASSEMBLY

CROSS-REFERENCE TO RELATED APPLICATION

This application claims the benefit of U.S. provisional patent application Ser. No. 63/690,729, filed Sep. 4, 2024, for POWER TAKEOFF ASSEMBLY HAVING A TWO-PART SHAFT ASSEMBLY, which is incorporated herein by reference.

FIELD OF THE INVENTION

This invention relates to power takeoff devices (PTOs), which are useful for mounting on transmissions and for performing, directly or indirectly, useful work via the PTO's rotatable output shaft. More particularly, this disclosure relates to a PTO assembly having a two-part shaft assembly allowing for the in-field adjustment of bearing end-play. The PTO assembly having a two-part shaft assembly includes a main shaft having a smaller diameter threaded extension and an end cap having a corresponding threaded section, wherein the main shaft receives the end cap to form a two-part shaft assembly, and the length of the two-part shaft assembly can vary depending on the threading of the end cap onto the main shaft.

BACKGROUND

PTO assemblies typically include a pair of spaced apart, opposing taper roller bearings seated against the shaft which help to support the shaft through their ability to handle radial and axial loads simultaneously. Taper roller bearings are manufactured with a cup (i.e., outer race) and cone (i.e., inner race, roller elements, and cage). The cup and cone are not fixed together, so the PTO assembly must make accommodations to ensure that the cup and cone of each taper roller bearing stay in the proper position. The term "end-play" refers to the total distance the shaft can move between the bearings, and is alternatively referred to in the industry as "float," "thrust bearing clearance" or "axial clearance." If the taper roller bearings are configured with excessive end-play, the shaft may move back and forth between the bearings, increasing wear and reducing the effective life of the bearings. Alternatively, if the bearings are configured with insufficient end-play, also referred to as the bearings having excessive preload, pressure on the bearings may also increase wearing and reduce the effective life of the bearings. Machining tolerances on various PTO assembly components can lead to excessive variation of taper roller bearing end-play in PTO assemblies.

To compensate for such variation and achieve the desired end-play, PTO assemblies often include features to adjust the end-play. PTO assemblies are frequently designed to have adjustability in the housing in order to affect end-play. In some embodiments, a threaded sleeve is used to change end-play. In other embodiments, a two-piece housing assembly is used and shims of varying thickness are inserted between the pieces of the assembly to change end-play. In such embodiments, the components for a given assembly are pre-assembled and the end-play is measured. A shim with the desired thickness is then selected and placed between the housing and output cover of the two-piece housing assembly. The assembly is then reassembled, and the end-play is again measured. The process is repeated as necessary until the desired end-play is achieved. This method of end-play adjustment has several disadvantages including the need for complex devices to measure end-play in the pre-assembled unit, addressing measurement error, the need to stock a wide range of shims in various thicknesses, and the need to repeat the end-play adjustment process until the desired end-play is achieved.

In these methods for end-play adjustment, the shaft is a rigid, fixed length body. In these methods for end-play adjustment, the end-play adjustment feature typically addresses the end-play from the outboard ends of the shaft towards the middle. In other words, the outer assembly of the PTO is compressed to accommodate the length of the rigid shaft. A need exists for a PTO system that can effectively change the overall shaft assembly length, allowing for in-field adjustment of end-play, and dispensing with the need for disassembly and reassembly of the PTO assembly during end-play adjustment.

SUMMARY

Embodiments of the present disclosure introduce new systems and methods for end-play adjustment in PTO assemblies by utilizing a two-part shaft assembly in the PTO assembly. The two-part shaft assembly allows for the overall shaft assembly to effectively change length, allowing for adjustment of end-play after the main unit has been assembled, without having to measure, select shims, disassemble, and reassemble the main unit, and allowing for adjustment of end-play from inboard-out, rather than outboard-in. The two-part shaft assembly also allows for in-field adjustment of end-play without the need to remove the PTO assembly from the vehicle's transmission.

Some embodiments of the present invention relate to a power takeoff assembly having a two-part shaft assembly, comprising: a main shaft including a shaft body, an axis, and a cylindrical extension extending from the shaft body along the axis, the extension having a smaller diameter than the shaft body, wherein the extension includes a threaded portion and a face portion opposite the shaft body; and an end cap having a face portion, an opening opposite the face portion, a sidewall extending between the face portion and the opening, and a hollow interior including an internal threaded section, wherein the opening is sized to receive at least a portion of the extension such that the threaded portion of the extension mechanically engages the internal threaded section of the end cap; wherein the main shaft and the end cap comprise the two-part shaft assembly. In further embodiments, the face portion of the end cap includes a plurality of threaded holes, the face portion of the extension includes a plurality of holes, and rotation of the end cap with respect to the extension aligns one of the plurality of threaded holes in the end cap with one of the plurality of holes in the extension. In certain embodiments, the invention includes a fastener inserted serially through one of the plurality of threaded holes in the end cap and one of the plurality of holes in the extension, the fastener mechanically preventing rotation of the end cap with respect to the extension. In some embodiments, each of the plurality of threaded holes is spaced 40° apart from another of the plurality of threaded holes. In further embodiments, the plurality of threaded holes are two holes spaced 157.5° apart. In certain embodiments, the plurality of holes includes at least three, at least four, at least five, at least six, at least seven, or at least eight holes. In a specific embodiment, the plurality of holes includes six holes. In certain embodiments, the invention includes a power takeoff housing, a first bearing within the housing, and a second bearing within the housing, wherein the first bearing and the second bearing each radially surround the two-part shaft assembly with at least a portion of the shaft assembly extending between the first bearing and the second bearing. In some embodiments, the first bearing radially surrounds the end cap of the two-part shaft assembly and wherein the second bearing radially surrounds the main shaft of the two-part shaft assembly. In further embodiments, rotation of the end cap with respect to the extension increases or decreases a length of the portion of the shaft assembly extending between the first bearing and the second bearing, thereby adjusting end-play of the two-part shaft assembly.

Further embodiments of the present invention relate to a method of adjusting end-play in a power takeoff assembly, the method comprising: providing a two-part shaft assembly for the power takeoff assembly, the two-part shaft assembly including: a main shaft including a shaft body, an axis, and a cylindrical extension extending from the shaft body along the axis, the extension including a face portion opposite the shaft body and having a smaller diameter than the shaft body; and an end cap having a face portion, an opening opposite the face portion, a sidewall extending between the face portion and the opening, and a hollow interior, wherein the opening is sized to receive at least a portion of the extension; wherein at least a portion of the extension of the main shaft is inserted within the end cap; rotating the end cap with respect to the main shaft, thereby changing a length of the two-part shaft assembly, to achieve a desired end-play; and securing the end cap to the main shaft by inserting a fastener through the end cap and into the main shaft, the fastener preventing further rotation of the end cap with respect to the main shaft. In further embodiments, the extension includes a threaded portion; the hollow interior of the end cap includes an internal threaded section; and the threaded portion of the extension mechanically engages the internal threaded section of the end cap. In certain embodiments, the face portion of the end cap includes a plurality of threaded holes; the face portion of the extension includes a plurality of holes; and rotating the end cap with respect to the extension aligns one of the plurality of threaded holes in the end cap with one of the plurality of holes in the extension. In some embodiments, securing the end cap to the main shaft includes inserting a fastener through one of the plurality of threaded holes in the face portion of the end cap and into one of the plurality of holes in the face portion of the extension of the main shaft. In further embodiments, the power takeoff includes a power takeoff housing, a first bearing within the housing, and a second bearing within the housing, wherein the first bearing and the second bearing each radially surround the two-part shaft assembly with at least a portion of the shaft assembly extending between the first bearing and the second bearing. In certain embodiments, the first bearing radially surrounds the end cap of the two-part shaft assembly and wherein the second bearing radially surrounds the main shaft of the two-part shaft assembly. In some embodiments, rotating the end cap with respect to the main shaft increases or decreases the length of the portion of the shaft assembly extending between the first bearing and the second bearing, thereby adjusting end-play.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

DETAILED DESCRIPTION OF THE PREFERRED EMBODIMENTS

Figure 1:
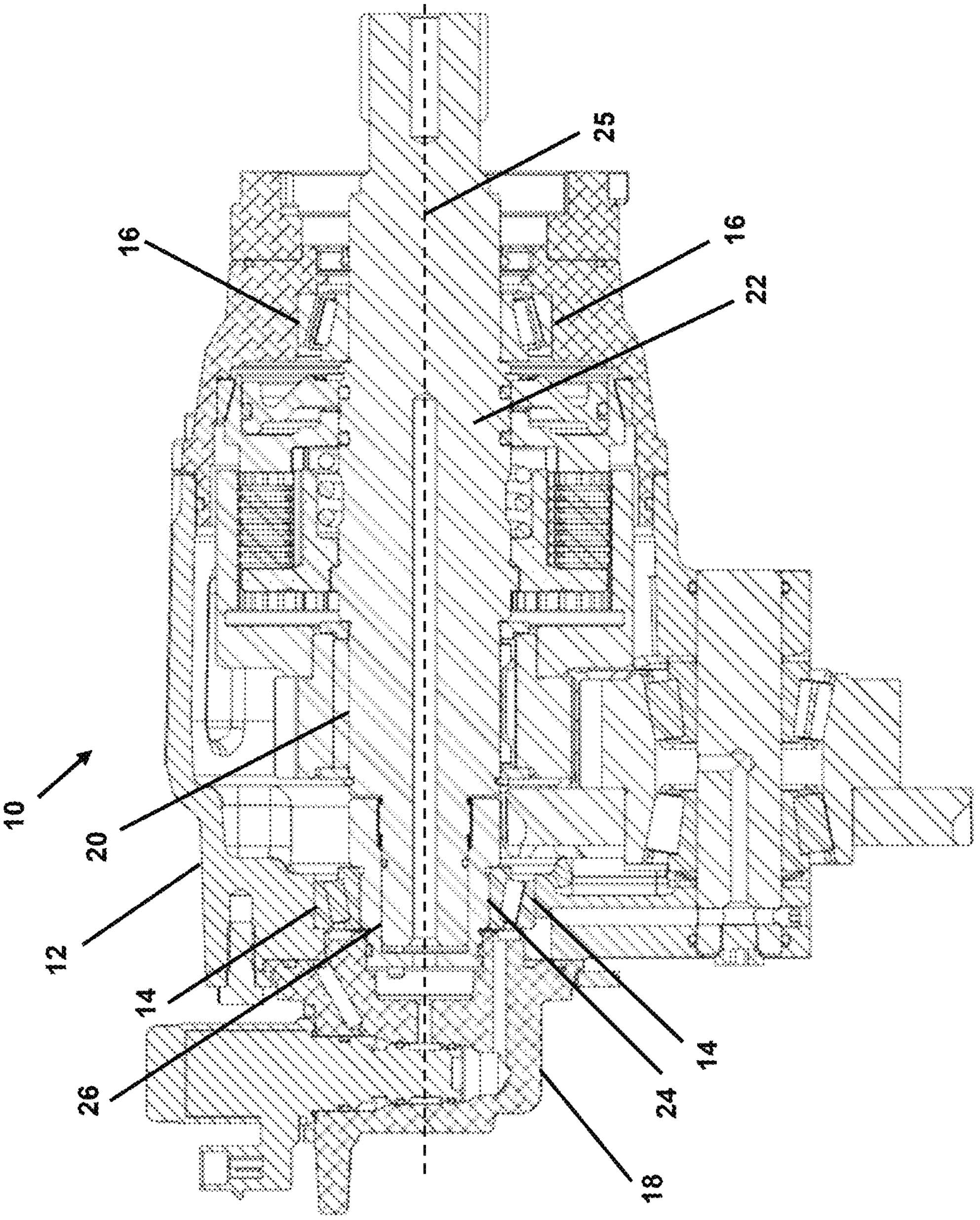
FIG. 1 depicts a cross-sectional view along the axis of a two-part shaft of a PTO assembly having a two-part shaft assembly to adjust bearing end-play, according to a first embodiment of the present invention.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. The words "about" or "approximately," when used with numbers and unless otherwise defined, refer to values within 10% of the most precise digit of the numbers (e.g., "about 1" refers to the range of 0.9 to 1.1, while "about 1.0" refers to the range of 0.99 to 1.01). Discussions pertaining to specific compositions of matter, if present, are presented as examples only and do not limit the applicability of other compositions of matter, especially other compositions of matter with similar properties, unless otherwise indicated.

Embodiments of the present invention include a PTO assembly having a two-part shaft assembly, allowing the shaft assembly to change length for the adjustment of bearing end-play.

Figure 2:
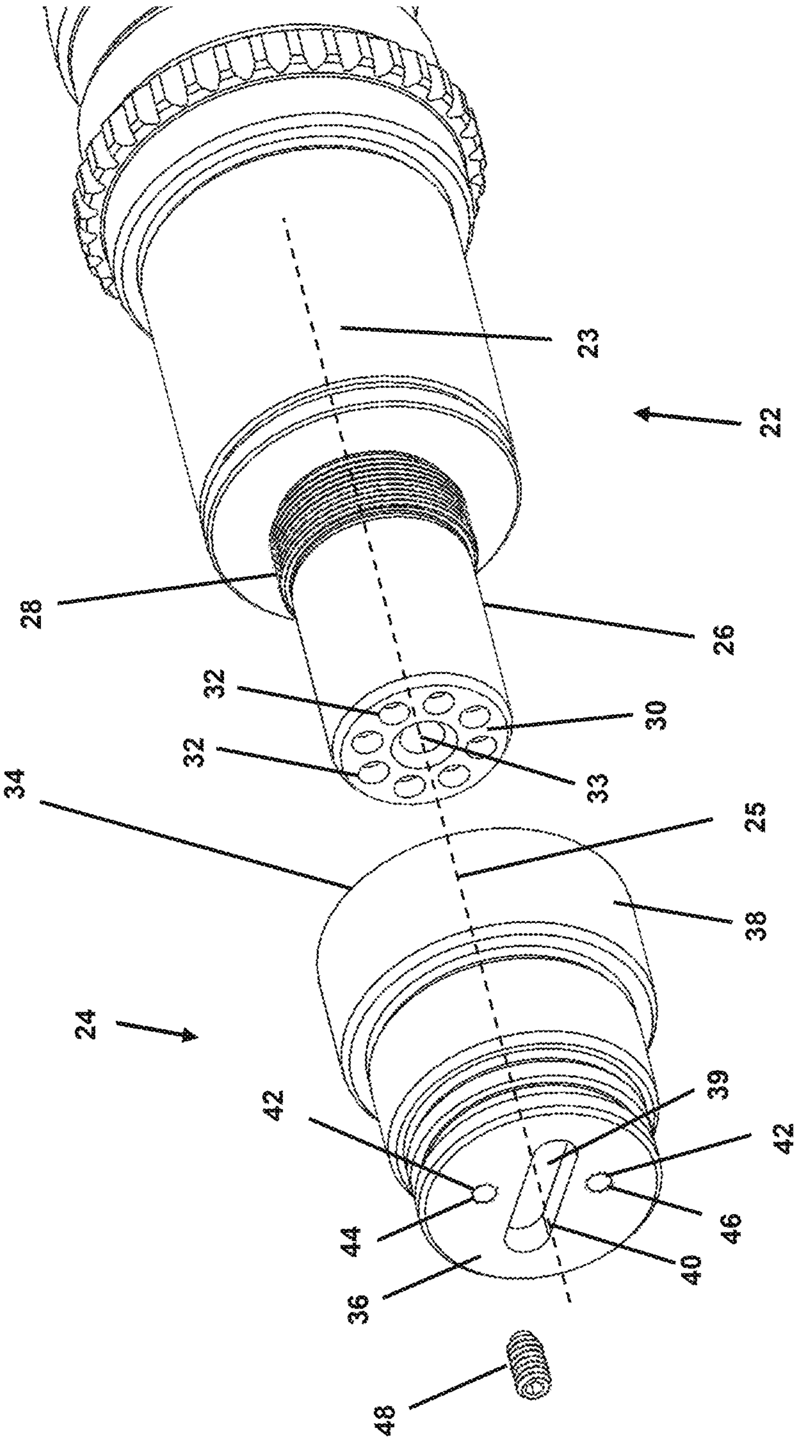
FIG. 2 depicts a partial exploded view of a two-part shaft assembly to adjust bearing end-play, according to the first embodiment of the present invention.

Referring to FIGS. 1 and 2, a first embodiment of a PTO assembly 10 includes a main housing 12, a first taper roller bearing 14, a second taper roller bearing 16, a solenoid cover 18 removably attachable to the main housing 12, and a shaft assembly 20 located at least partially within the main housing 12. The first bearing 14 and second bearing 16 each include an outer race and an inner cone. The first taper roller bearing 14 and second taper roller bearing 16 each radially surround the shaft assembly 20 within the main housing 12 with a portion of the shaft assembly located between the bearings 14, 16. The shaft assembly 20 includes a main shaft 22, an end cap 24, and an axis 25. The main shaft 22 includes shaft body 23 and a cylindrical extension 26 that extends axially from the shaft body 23, the extension 26 having a diameter smaller than that of the shaft body 23. The extension 26 includes a threaded portion 28 and terminates in a face portion 30. In the first embodiment shown in FIG. 2, the threaded portion 28 extends circumferentially about the extension 26 adjacent to the shaft body 23 and extends partway along the length of the extension 26. The face portion 30 is a surface perpendicular to the axis 25 and contains a plurality of holes 32 radially spaced thereon. The face portion 30 further includes a central hole 33 around which the plurality of holes 32 are spaced. The central hole 33 allows for fluid flow through the main shaft 22 to a piston/clutch (not shown).

The end cap 24 includes an opening 34, a face portion 36 opposite the opening 34, and a sidewall 38 extending between the opening 34 and face portion 36. The opening 34 provides access to a hollow interior 39 of the end cap 24, which is sized to receive at least a portion of the extension 26. The interior 39 includes an internal threaded portion (not visible) that corresponds with the threaded portion 28 of the extension 26. The face portion 36 of the end cap 24 includes a slot 40 and a plurality of threaded holes 42. In the depicted first embodiment, the plurality of threaded holes 42 includes a first hole 44 and a second hole 46. The slot 40 is centered on the face portion 36 of the end cap 24 and located between the first hole 44 and the second hole 46. The end cap 24 has varying diameters along the length of the sidewall 38, with the smallest diameter at the end with the face portion 36 and the largest diameter at the opposite end with the opening 34.

In use, the interior 39 of the end cap 24 receives at least a portion of the extension 26, with the internal threaded portion of the end cap 24 mechanically engaging the threaded portion 28 of the extension 26. A user may insert a tool, such as a flathead screw driver, into the slot 40 and rotate the tool to rotate the end cap 24 with respect to the main shaft 22, in order to align one of the plurality of threaded holes 42 on the face portion 36 of the end cap 24 with one of the plurality of holes 32 in the face portion 30 of the extension 26. A fastener 48 may then be inserted in a direction parallel to the axis 25 through one of the plurality of threaded holes 42 in the face portion 36 of the end cap 24 and into one of the plurality of holes 32 in the face portion 30 of the extension 26, thereby fixing the position of the end cap 24 with respect to the main shaft 22. In some embodiments, the fastener 48 is a set screw, threaded bolt, or other type of fastener as generally known in the art. In certain embodiments, as shown in FIG. 2, the fastener 48 is a set screw which, when inserted through one of the plurality of threaded holes 42 in the end cap 24 and into one of the plurality of holes 32 in the extension, fits flush with and does not extend past the face portion 36 of the end cap 24.

The total length of the shaft assembly 20 can vary depending on the distance the end cap 24 is threaded onto the main shaft 22 and the positioning of the fastener, allowing for adjustment of bearing end-play. When the end cap 24 is seated against the shaft body 23, the shaft assembly 20 will be at its shortest length with maximum end-play. The bearing end-play can then be adjusted by rotating (i.e., unscrewing) the end cap 24 with respect to the main shaft 22, thereby lengthening the shaft assembly 20 until the desired end-play is achieved. Once the desired end-play is achieved, the fastener 48 can be tightened into one of the plurality of threaded holes 42 in the face portion 36 of the end cap 24 and extend into one of the plurality of holes 32 in the face portion 30 of the extension 26 to prevent further rotation of the end cap 24 with respect to the main shaft 22.

Figure 3:
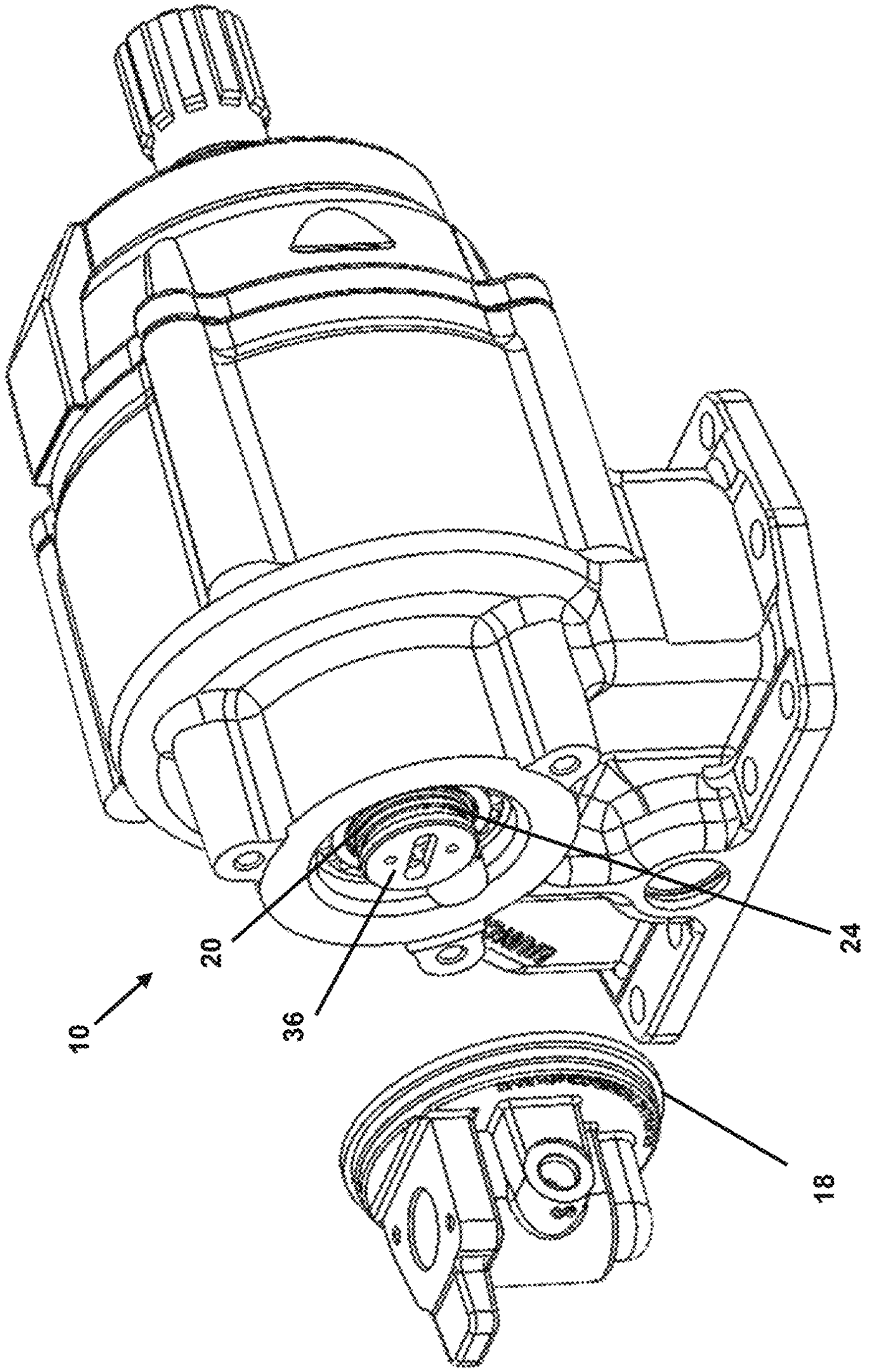
FIG. 3 depicts a perspective view of the PTO assembly of FIG. 1 with the solenoid cover spaced apart from the main housing.

Depicted in FIG. 3 is a PTO assembly 10 having a two-part shaft assembly according to a first embodiment of the present invention. The PTO assembly 10 can be assembled with the end cap 24 completely seated against the main shaft 22 (not visible in FIG. 3). In this position, the shaft assembly 20 will be at its shortest length with maximum end-play. When the PTO assembly 10 is mounted on a vehicle, bearing end-play can be adjusted in the field without removing the PTO assembly 10 from the vehicle's transmission. The solenoid cover 18 can be removed from the PTO assembly 10 to access the end cap 24 of the shaft assembly 20. The end-play can be adjusted by rotating the end cap 24 with respect to the main shaft 22, thereby lengthening the shaft assembly 20 until the desired end-play is achieved. Once the end cap 24 is in the desired position, a fastener 48 can be used to retain the position of the end cap 24. The solenoid cover 18 can then be reinstalled on the PTO.

Figure 4A:
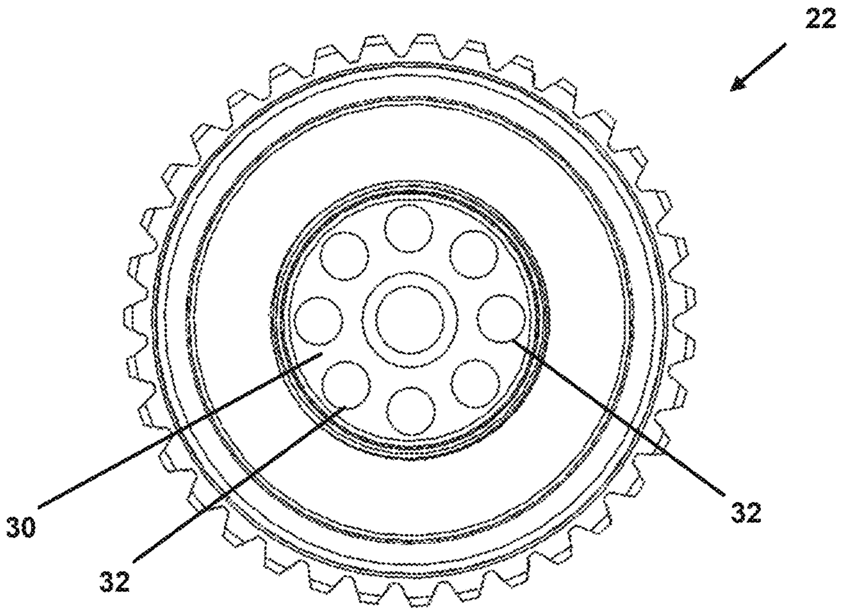
FIG. 4A depicts a front view of a main shaft of the two-part shaft assembly of FIG. 2.

Depicted in FIG. 4A is the face portion 30 of the main shaft 22 according to the first embodiment of the present invention. In the depicted embodiment, the plurality of holes 32 is eight holes. In the depicted embodiment, each hole of the plurality of holes 32 are radially spaced around the face portion 30 at forty-five-degree intervals.

Figure 4B:
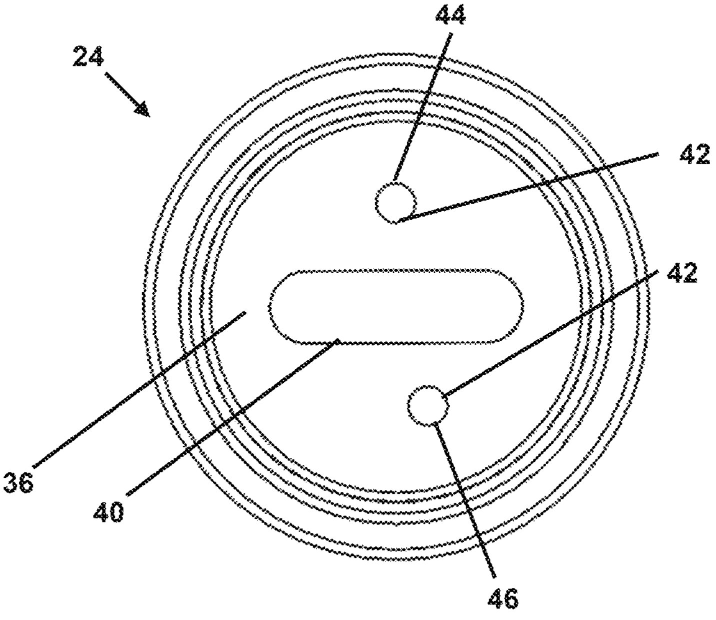
FIG. 4B depicts a front view of an end cap of the two-part shaft assembly of FIG. 2.

Depicted in FIG. 4B is the face portion 36 of the end cap 24 according to the first embodiment of the present invention. In the depicted embodiment, the first hole 44 and the second hole 46 of the plurality of threaded holes 42 are spaced 157.5 degrees apart. A user may utilize the different spacing intervals of the plurality of holes 32 in the main shaft 22 and the plurality of holes 38 in the end cap 24 to allow for precise positioning of the end cap 24 with respect to the main shaft 22. These spacing intervals allow for a finer adjustment (22.5 degrees of rotation) than would be possible if each hole of the plurality of holes 38 were at the same spacing interval as each hole of the plurality of holes 32, which would only allow for forty-five degrees of rotation. The slot 40 is centered on the face portion 36 and located between the first hole 44 and the second hole 46.

Figure 5A:
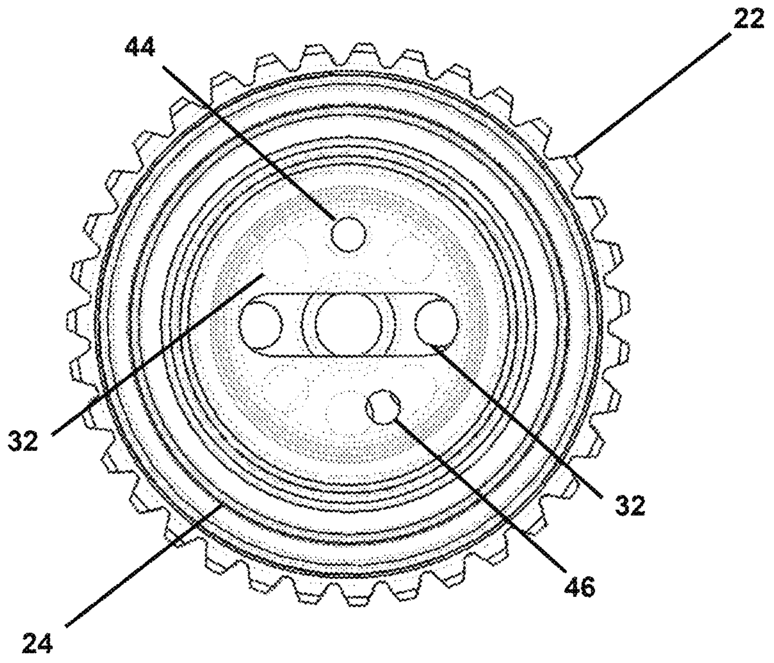
FIG. 5A depicts a front view of the end cap disposed over the main shaft in a first assembly position. Portions of the main shaft occluded by the end cap are shown in lighter, broken lines.

Depicted in FIG. 5A is the end cap 24 disposed over the main shaft 22 according to a first assembly position. When the first hole 44 of the end cap 24 is aligned with one of the plurality of holes 32 in the main shaft 22, the second hole 46 of the end cap 24 is not aligned with any of the plurality of holes 32 in the main shaft 22.

Figure 5B:
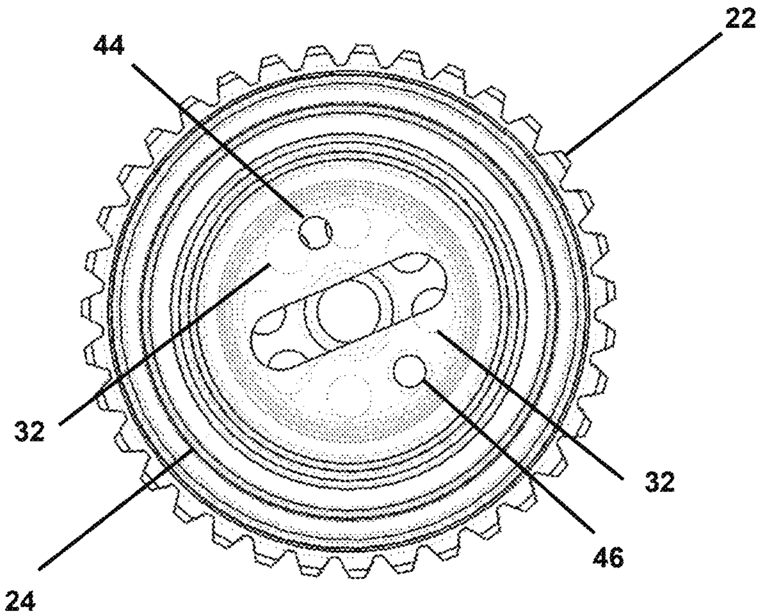
FIG. 5B depicts a front view of the end cap disposed over the main shaft in a second assembly position. Portions of the main shaft occluded by the end cap are shown in lighter, broken lines.

Depicted in FIG. 5B is the end cap 24 disposed over the main shaft 22 according to a second assembly position. When the second hole 46 of the end cap 24 is aligned with one of the plurality of holes 32 in the main shaft 22, the first hole 44 of the end cap 24 is not aligned with any of the plurality of holes 32 in the main shaft 22. As should be understood, the end cap 24 may be disposed with respect to the main shaft 22 in any one of sixteen distinct assembly positions (each separated by 22.5 degrees of rotation) at which either the first hole 44 or the second hole 46 is aligned with one of the plurality of holes 32 and can receive a fastener 48 extending therethrough.

Figure 6A:
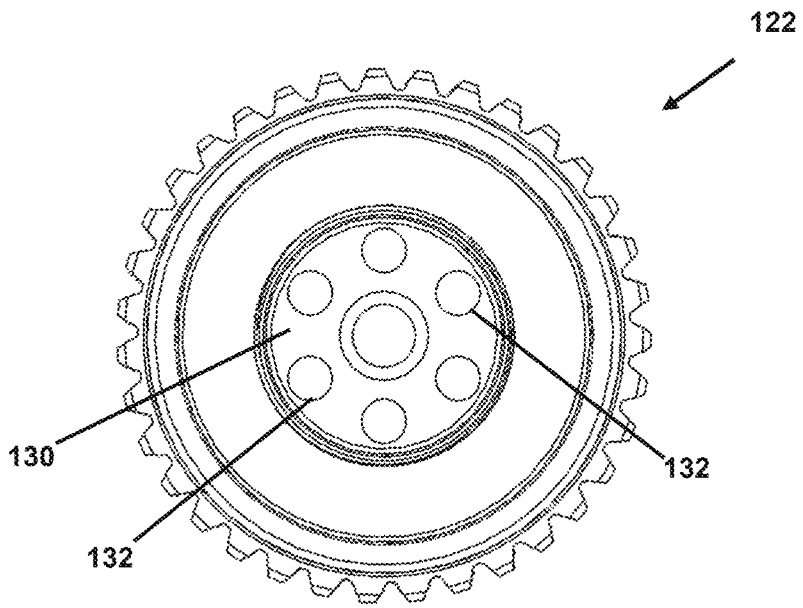
FIG. 6A depicts a front view of a main shaft of a two-part shaft assembly to adjust bearing end-play, according to a second embodiment of the present invention.

Depicted in FIG. 6A is a face portion 130 of the main shaft 122 according to a second embodiment of the present invention. The second embodiment is identical to the first embodiment except for the number and arrangement of holes on the respective face portions 30, 130 of the main shafts 22, 122 and the face portions 36, 136 of the end caps 24, 124. In other embodiments, other numbers and arrangements of holes may be present. In the depicted second embodiment, the plurality of holes 132 is six holes, each spaced at sixty-degree intervals.

Figure 6B:
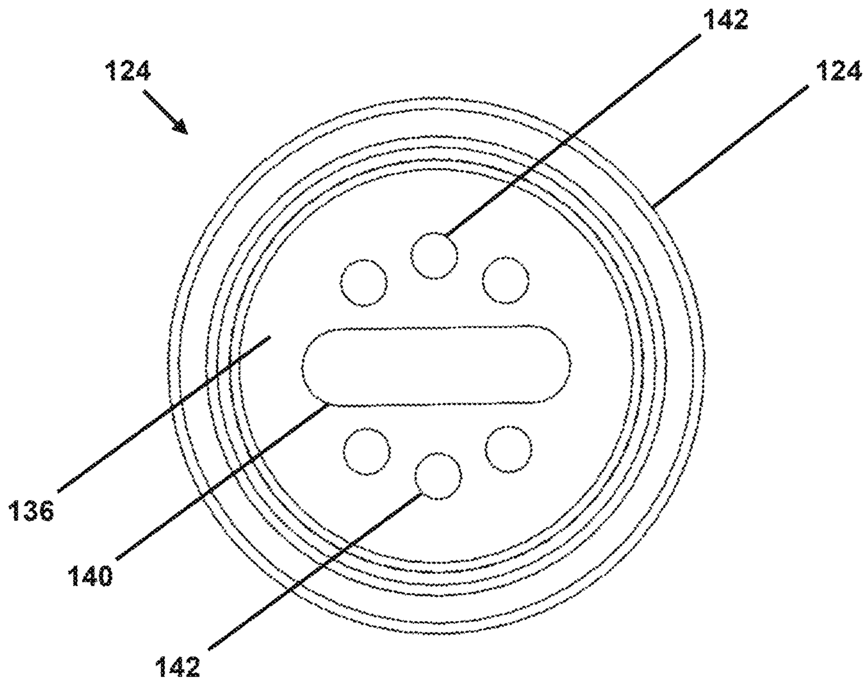
FIG. 6B depicts a front view of an end cap of the two-part shaft assembly according to the second embodiment of the present invention.

Depicted in FIG. 6B is a face portion 136 of an end cap 124 according to a second embodiment of the present invention. Face portion 136 of end cap 124 includes a slot 140 and a plurality of threaded holes 142. In the depicted second embodiment, the plurality of threaded holes 142 includes six holes, arranged in groups of three on either side of the slot 140, wherein the three holes in each group are radially spaced forty degrees apart from each other and the groups are radially spaced 100 degrees from each other.

A user may utilize the different spacing intervals of the plurality of holes 132 in the main shaft 122 and the plurality of threaded holes 142 in the end cap 124 to allow for precise positioning of the end cap 124 with respect to the main shaft 122. These spacing intervals allow for a finer adjustment (20.0 degrees of rotation), than would be possible if each hole of the plurality of threaded holes 142 were at the same spacing interval as each hole of the plurality of holes 132. The slot 140 is centered on the face portion 136 and located between the two groups of the plurality of holes 132.

Figure 7A:
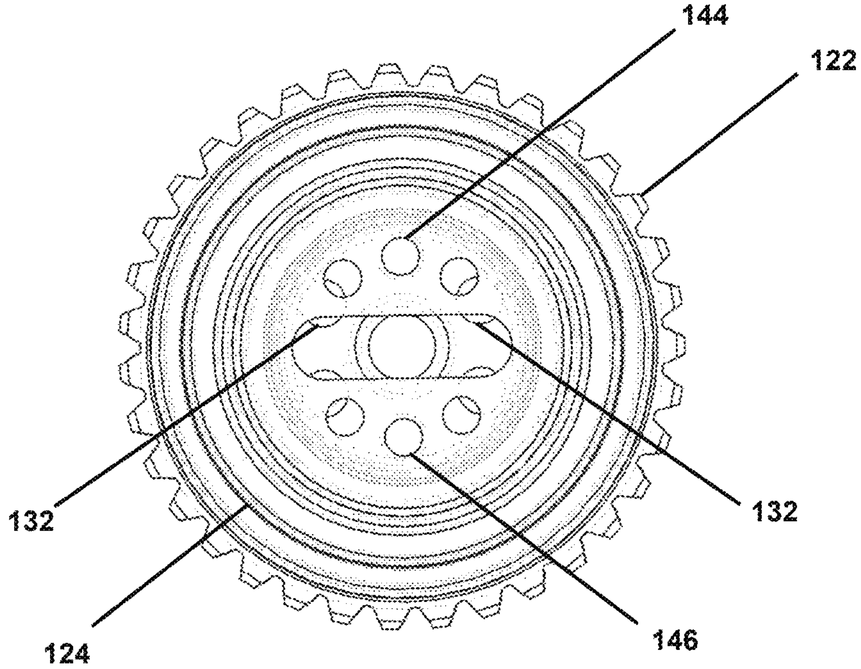
FIG. 7A depicts a front view of the end cap of FIG. 6B disposed over the main shaft of FIG. 6A in a first assembly position. Portions of the main shaft occluded by the end cap are shown in lighter, broken lines.

Depicted in FIG. 7A is the end cap 124 disposed over the main shaft 122 according to a first assembly position. When a first hole 144 and a second hole 146 of the plurality of threaded holes 142 of the end cap 124 are aligned with two of the plurality of holes 132 in the main shaft 22, the remaining threaded holes 142 in the end cap 124 are not aligned with any of the plurality of holes 132 in the main shaft 22. A user may insert a tool, such as a screw driver, into the slot 140 to rotate the end cap 124 with respect to the main shaft 122, to align two of the plurality of threaded holes 142 on the face portion 136 of the end cap 124 with two of the plurality of holes 132 in the face portion 130. Once the desired end-play is achieved, a first fastener (not shown) can be tightened into a first hole 144 of the plurality of threaded holes 142 in the face portion 136 of the end cap 124 and extending into one of the plurality of holes 132 in the face portion 130 of the extension 26. A second fastener can be tightened into a second hole 146 of the plurality of threaded holes 142 in the face portion 136 of the end cap 124 and extending into another of the plurality of holes 132 in the face portion 130. The fasteners fix the position of the end cap 124 with respect to the main shaft 122.

Figure 7B:
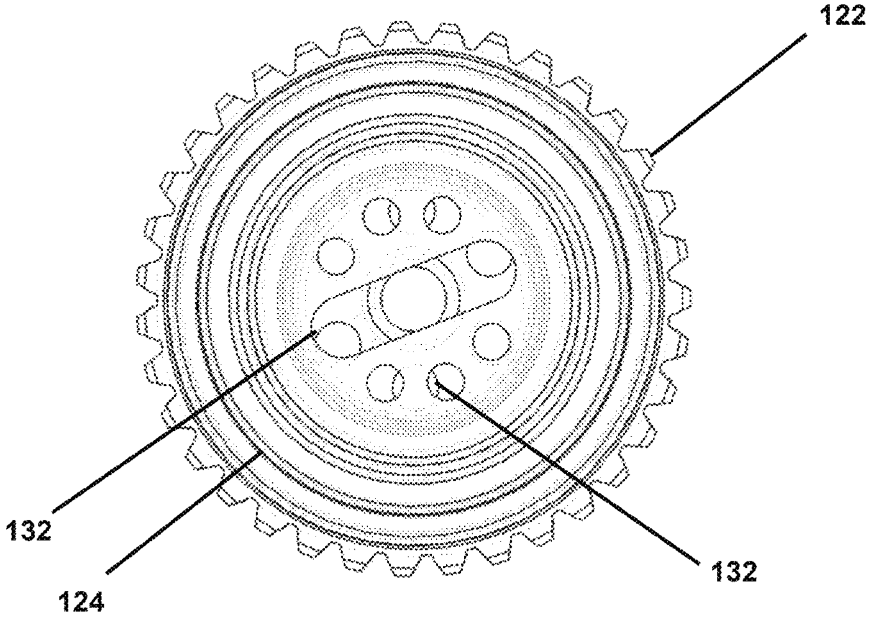
FIG. 7B depicts a font view of the end cap of FIG. 6B disposed over the main shaft of FIG. 6A in a second assembly position. Portions of the main shaft occluded by the end cap are shown in lighter, broken lines.

Depicted in FIG. 7B is the end cap 124 disposed over the main shaft 122 according to a second assembly position. As discussed above, when two of the plurality of threaded holes 142 in the end cap 124 are aligned with two of the plurality of holes 132 in the main shaft 22, the remaining threaded holes 142 of the end cap 124 are not aligned with any of the remaining holes 132 in the main shaft 22. As should be understood, the end cap 124 may be disposed with respect to the main shaft 122 in any one of eighteen distinct assembly positions (each separated by 20.0 degrees of rotation) at which two of plurality of threaded holes 142 of the end cap 124 are aligned with two of the plurality of holes 132 in the main shaft 122 and may receive fasteners extending therethrough.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A power takeoff assembly having a two-part shaft assembly, comprising:

a main shaft including a shaft body, an axis, and a cylindrical extension extending from the shaft body along the axis, the extension having a smaller diameter than the shaft body, wherein the extension includes a threaded portion and a face portion opposite the shaft body; and an end cap having a face portion, an opening opposite the face portion, a sidewall extending between the face portion and the opening, and a hollow interior including an internal threaded section, wherein the opening is sized to receive at least a portion of the extension such that the threaded portion of the extension mechanically engages the internal threaded section of the end cap;

wherein the main shaft and the end cap comprise the two-part shaft assembly.

2. The power takeoff assembly having a two-part shaft assembly of claim 1, wherein the face portion of the end cap includes a plurality of threaded holes;

wherein the face portion of the extension includes a plurality of holes; and wherein rotation of the end cap with respect to the extension aligns one of the plurality of threaded holes in the end cap with one of the plurality of holes in the extension.

3. The power takeoff assembly having a two-part shaft assembly of claim 2, further comprising a fastener inserted serially through one of the plurality of threaded holes in the end cap and one of the plurality of holes in the extension, the fastener mechanically preventing rotation of the end cap with respect to the extension.

4. The power takeoff assembly having a two-part shaft assembly of claim 2, wherein each of the plurality of threaded holes is spaced 40° apart from another of the plurality of threaded holes.

5. The power takeoff assembly having a two-part shaft assembly of claim 2, wherein the plurality of threaded holes are two holes spaced 157.5° apart.

6. The power takeoff assembly having a two-part shaft assembly of claim 2, wherein the plurality of holes includes at least six holes.

7. The power takeoff assembly having a two-part shaft assembly of claim 1, further comprising a power takeoff housing, a first bearing within the housing, and a second bearing within the housing, wherein the first bearing and the second bearing each radially surround the two-part shaft assembly with at least a portion of the shaft assembly extending between the first bearing and the second bearing.

8. The power takeoff assembly having a two-part shaft assembly of claim 7, wherein the first bearing radially surrounds the end cap of the two-part shaft assembly and wherein the second bearing radially surrounds the main shaft of the two-part shaft assembly.

9. The power takeoff assembly having a two-part shaft assembly of claim 8, wherein rotation of the end cap with respect to the extension increases or decreases a length of the portion of the shaft assembly extending between the first bearing and the second bearing, thereby adjusting end-play of the two-part shaft assembly.

10. A method of adjusting end-play in a power takeoff assembly, the method comprising:

providing a two-part shaft assembly for the power takeoff assembly, the two-part shaft assembly including:

a main shaft including a shaft body, an axis, and a cylindrical extension extending from the shaft body along the axis, the extension including a face portion opposite the shaft body and having a smaller diameter than the shaft body; and an end cap having a face portion, an opening opposite the face portion, a sidewall extending between the face portion and the opening, and a hollow interior, wherein the opening is sized to receive at least a portion of the extension;

wherein at least a portion of the extension of the main shaft is inserted within the end cap;

rotating the end cap with respect to the main shaft, thereby changing a length of the two-part shaft assembly, to achieve a desired end-play; and securing the end cap to the main shaft by inserting a fastener through the end cap and into the main shaft, the fastener preventing further rotation of the end cap with respect to the main shaft.

11. The method of claim 10, wherein the extension includes a threaded portion;

wherein the hollow interior of the end cap includes an internal threaded section; and wherein the threaded portion of the extension mechanically engages the internal threaded section of the end cap.

12. The method of claim 10, wherein the face portion of the end cap includes a plurality of threaded holes;

wherein the face portion of the extension includes a plurality of holes; and wherein rotating the end cap with respect to the extension aligns one of the plurality of threaded holes in the end cap with one of the plurality of holes in the extension.

13. The method of claim 12, wherein securing the end cap to the main shaft includes inserting a fastener through one of the plurality of threaded holes in the face portion of the end cap and into one of the plurality of holes in the face portion of the extension of the main shaft.

14. The method of claim 10, wherein the power takeoff includes a power takeoff housing, a first bearing within the housing, and a second bearing within the housing, wherein the first bearing and the second bearing each radially surround the two-part shaft assembly with at least a portion of the shaft assembly extending between the first bearing and the second bearing.

15. The method of claim 14, wherein the first bearing radially surrounds the end cap of the two-part shaft assembly and wherein the second bearing radially surrounds the main shaft of the two-part shaft assembly.

16. The method of claim 15, wherein rotating the end cap with respect to the main shaft increases or decreases the length of the portion of the shaft assembly extending between the first bearing and the second bearing, thereby adjusting end-play.

* * * * *